US006004661A

United States Patent [19]

Sakai et al.

[11] Patent Number: 6,004,661

[45] Date of Patent: Dec. 21, 1999

[54] AMORPHOUS MAGNETIC MATERIAL AND MAGNETIC CORE USING THE SAME

[75] Inventors: Kazumi Sakai, Fujieda; Takao Kusaka; Yasuaki Moriya, both of Yokohama, all of Japan

[73] Assignee: Kabushiki Kaisha Toshiba, Kawasaki, Japan

[21] Appl. No.: 09/103,391

[22] Filed: Jun. 24, 1998

[30] Foreign Application Priority Data

Jun. 24, 1997 [JP] Japan ................................ P9-167580

[51] Int. Cl.[6] ........................................................ B32B 7/02

[52] U.S. Cl. .......................... 428/216; 428/606; 428/692; 428/694 T; 420/435; 420/440; 148/403; 148/408; 148/425

[58] Field of Search .................................... 428/216, 606, 428/692, 694 T, 694 TR; 420/435, 440; 148/403, 408, 425

[56] References Cited

U.S. PATENT DOCUMENTS

| | | | |
|---|---|---|---|
| 4,473,417 | 9/1984 | Inomata et al. | 148/403 |
| 5,470,646 | 11/1995 | Okamura et al. . | |
| 5,804,282 | 9/1998 | Watanabe et al. | 428/141 |

FOREIGN PATENT DOCUMENTS

| | | |
|---|---|---|
| 0 042 525 | 12/1981 | European Pat. Off. . |
| 2 233 345 | 1/1991 | European Pat. Off. . |
| 57-13146 | 1/1982 | Japan . |
| 58-193344 | 11/1983 | Japan . |
| 60-16512 | 4/1985 | Japan . |
| 4-500985 | 2/1992 | Japan . |
| 5-311321 | 11/1993 | Japan . |
| 8-60312 | 3/1996 | Japan . |

*Primary Examiner*—Elizabeth Evans

*Attorney, Agent, or Firm*—Oblon, Spivak, McClelland, Maier & Neustadt, P.C.

[57] ABSTRACT

An amorphous magnetic material possesses a composition essentially expressed by $(Fe_{1-a-b}N_aM_b)_{100-x-y}Si_xB_y$ (M denotes at least one kind of element selected from Mn, Cr, Co, Nb, V, Mo, Ta, W and Zr, $0.395 \leqq a \leqq 0.7$, $0 \leqq b \leqq 0.21$, $1-a-b<a$, $6 \leqq x \leqq 18$ at %, $10 \leqq y \leqq 18$ at %, respectively). An amorphous magnetic material which has such a Ni rich Fe-Ni base possesses a Curie temperature $T_c$ of 473 to 573K, the maximum magnetic flux density $B_m$ of 0.5 to 0.9T. A ratio of residual magnetic flux density $B_r$ and the maximum magnetic flux density $B_m$ can be controlled according to a required characteristics, and, in the case of being used in a saturable core, is set at 0.60 or more. With an amorphous magnetic material of an inexpensive Fe-Ni base, magnetic characteristics applicable in a high frequency region, thermal stability, surface smoothness can be realized.

20 Claims, 2 Drawing Sheets

AMORPHOUS MAGNETIC MATERIAL AND MAGNETIC CORE USING THE SAME

BACKGROUND OF THE INVENTION

1. Field of the Invention

The present invention relates to an amorphous magnetic material suitable for a saturable magnetic core used as a saturable reactor or a noise suppressor, or a magnetic core used for an accelerator or a laser power supply, and a magnetic core using thereof.

2. Description of the Related Art

Switching power supplies are used in abundance as stabilizing power supplies of electronic instruments. In particular, a switching power supply assembled a magnetic amplifier (refers to as "magamp" hereinafter) for output control is being widely used due to its easiness in obtaining multiple outputs and its low noise.

A magamp is mainly composed of a saturable reactor, as a main portion thereof a saturable core is used. In a switching power supply, a saturable core is used also as a noise suppressor. For a constituent material of such a saturable core, since excellent square magnetization property is required, mainly, an Fe-Ni based crystalline alloy (permalloy) or a Co based amorphous magnetic alloy have been used.

However, in accordance with a recent demand for miniaturization, light weight, high performance of electronic instruments, a switching power supply is also strongly demanded to be miniature, light weight. Therefore, in a switching power supply, a switching frequency tends to be made higher. However, an Fe-Ni based crystalline alloy being used conventionally has such a defect that its coercive force becomes large in higher frequency region, resulting in remarkable increases of an eddy current loss. Therefore, it is not suitable for application in the high frequency region.

Besides, a Co based amorphous magnetic alloy, in addition to its excellent squareness characteristics and thermal stability, has an excellent property such as small loss even in the high frequency region. However, because of much inclusion of expensive Co, it has a difficulty that a manufacturing cost of a saturable core becomes high.

As amorphous magnetic materials other than Co based one, an Fe based amorphous magnetic alloy is being used in various fields, in addition, a micro-crystalline Fe based soft magnetic alloy is also known. However, these magnetic materials are large in their coercive force and maximum magnetic flux density $B_m$, resulting in a large loss in a high frequency region. Therefore, they are not suitable for a saturable core material.

Increase of the loss in a high frequency region also becomes a problem when an Fe based amorphous magnetic alloy is employed for a magnetic core other than a saturable core. Though an Fe based amorphous magnetic alloy has been used as a constituent material of such as a choke coil or a transformer, a higher frequency tendency invites a problem of the increase of the loss. The Fe based amorphous magnetic alloy also has a defect of being low in its thermal stability of the magnetic properties.

Further, both the conventional Co based amorphous magnetic alloy and Fe based amorphous magnetic alloy are high in their melting points, as a result, when thin film is formed with such as a liquid metal quenching method, tends to become rough in their surface roughness. Lowering of surface property of an amorphous magnetic alloy thin ribbon, when being wound or laminated to form a magnetic core, becomes a cause of deterioration of magnetic property such as squareness ratio.

As a conventional amorphous magnetic material, other than the Co based or Fe based amorphous magnetic alloy, an amorphous magnetic alloy based on Fe-Ni is known. For instance, Japanese Patent Application Laid-Open No. Sho-58(1983)-193344 discloses an amorphous magnetic alloy possessing a composition expressed by $(Fe_{1-a}Ni_a)_{100-x-y}Si_xB_y$ ($0.2 \leqq a \leqq 0.4$, $20 \leqq x+y \leqq 25$ at %, $5 \leqq x \leqq 20$ at %, $5 \leqq y \leqq 20$ at %).

Further, Japanese Patent Application Laid-Open (Kohyo) No. Hei-4(1992)-500985 discloses a magnetic metallic glass alloy which has a composition expressed by $Fe_aNi_bM_cB_dSi_eC_f$ (here, M is Mo, Cr, $39 \leqq a \leqq 41$ at %, $37 \leqq b \leqq 41$ at %, $0 \leqq c \leqq 3$ at %, $17 \leqq d \leqq 19$ at %, $0 \leqq e \leqq 2$ at %, $0 \leqq f \leqq 2$ at %) and at least 70% thereof is glassy. Japanese Patent Application Laid-Open No. Hei-5(1993)-311321 discloses a super-thin soft magnetic alloy ribbon possessing a composition expressed by $Fe_{100-x-y-z}Ni_xSi_yB_z$ ($1 \leqq X \leqq 30$ at %, $10 \leqq Y \leqq 18$ at %, $7 \leqq Z \leqq 17$ at %, $X+Y+Z<80$ at %).

The above described respective amorphous magnetic alloy, though Fe-Ni is a base component of a magnetic alloy, is an Fe rich magnetic alloy of which main component is Fe. Therefore, as identical as the above described Fe based amorphous magnetic alloy, it has a defect of the loss being large, further, thermal stability of magnetic properties being low. When a thin film ribbon is formed with a liquid quenching method or the like, that similarly tends to cause a defect of being large in its surface roughness.

In addition, Japanese Patent Application No. Sho-60 (1985)-16512 discloses an amorphous magnetic alloy which has a composition expressed by $(Fe_{1-a}Ni_a)_{100-y}X_y$ (X is Si and B, $0.3 \leqq a \leqq 0.65$, $15<y \leqq 30$ at %) and is excellent in its corrosion resistivity and in its stress-corrosion cracking resistance. Japanese Patent Application Laid-Open No. Sho-57(1982)-13146 discloses an amorphous alloy expressed by $(Fe_{1-a}Ni_a)_{100-x-y}Si_xB_y$ ($0.2 \leqq a \leqq 0.7$, $1 \leqq x \leqq 20$ at %, $5 \leqq y \leqq 9.5$ at %, $15 \leqq x+y \leqq 30$ at %).

These amorphous magnetic alloys, as identical as the above described Fe-Ni based amorphous magnetic alloys, have basically Fe rich alloy compositions. Further, since they are not expected to be used as constituent material of such as a saturable core, a low-loss core, a high permeability core, the composition ratio of Si or B does not correspond to usage in a high frequency region, further, additive elements other than these primary components also are not fully investigated.

As described above, a Co based amorphous magnetic alloy conventionally used as a saturable core material, because of high content of the expensive Co, has a defect that the manufacturing cost of a magnetic core is high. Besides, among magnetic materials other than Co based one, an Fe based amorphous magnetic alloy and an Fe rich Fe-Ni based amorphous magnetic alloy have defects such that they are large in their loss in a high frequency region and low in their thermal stability. Further, anyone of the conventional amorphous magnetic alloys has a high melting point, and, as a result, when a thin film ribbon is formed with a liquid quenching method, its surface roughness tends to become large.

SUMMARY OF THE INVENTION

Therefore, an objective of the present invention is to provide an inexpensive amorphous magnetic material which possesses magnetic properties suitable for usage in a high frequency region when used as such as a saturable core, a low loss core, a high permeability core and the like, and is excellent in thermal stability of its magnetic properties.

Another objective of the present invention, when a thin film ribbon is formed with a liquid quenching method and the like, is to provide an amorphous magnetic material capable of enhancing a surface smoothness.

Still another objective of the present invention, by employing an amorphous magnetic material like this, is to provide a magnetic core inexpensive and excellent in its magnetic properties.

An amorphous magnetic material of the present invention is characterized in comprising a composition expressed substantially by general formula:

$$(Fe_{1-a-b}Ni_aM_b)_{100-x-y}Si_xB_y$$

(in the formula, M denotes at least one kind of element selected from Mn, Cr, Co, Nb, V, Mo, Ta, W and Zr, a, b, x and y are values satisfying $0.395 \leqq a \leqq 0.7$, $0 \leqq b \leqq 0.21$, $1-a-b<a$, $6 \leqq x \leqq 18$ at %, $10 \leqq y \leqq 18$ at %, respectively).

A amorphous magnetic material of the present invention can be used as, for instance, an amorphous magnetic thin film ribbon. And, a magnetic core of the present invention is characterized in comprising a coiled body or a stacked body of the amorphous magnetic material of the present invention possessing the above described thin film ribbon shape.

In the present invention, as a base component of the amorphous magnetic material, Ni rich Fe-Ni is used, and, to such a base component, Si and B indispensable for rendering amorphous are compounded with a predetermined ratio. According to such an alloy composition, Fe-Ni inexpensive compared with Co is a base component, moreover, the excellent magnetic properties such as saturable magnetic property, low loss property, high permeability all of which are comparable to the Co based amorphous magnetic material can be obtained.

Further, in the amorphous magnetic material of the present invention, by compounding M element which is at least one kind of element selected from Mn, Cr, Co, Nb, V, Mo, Ta, W and Zr, as described above, its thermal stability of magnetic properties can be heightened. In particular, by employing two kinds or more of elements selected from Mn, Cr and Co as the M element, further more preferable thermal stability can be obtained.

An amorphous magnetic material in which Ni rich Fe-Ni is a base is low in its melting point compared with that of conventional amorphous magnetic materials of a Co base or an Fe base. Therefore, the amorphous magnetic material of the present invention, when being rendered a thin film ribbon with a liquid quenching method, can be improved in its surface smoothness. An amorphous material excellent in its surface smoothness contributes in improvement of its magnetic properties of a magnetic core formed by coiling or stacking.

DESCRIPTION OF THE PREFERRED EMBODIMENTS

Figure 1:
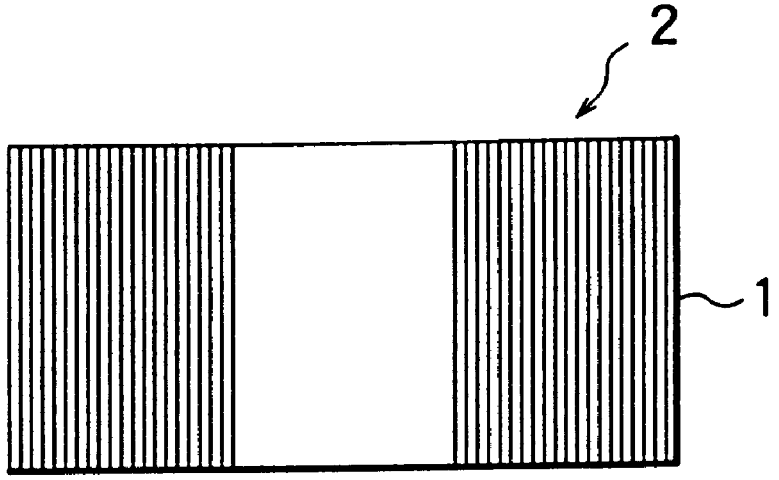
FIG. 1 is a sectional view showing a structure of a magnetic core of one embodiment of the present invention.

In the following, embodiments carrying out the present invention will be described.

An amorphous magnetic material of the present invention possesses a composition expressed substantially by general formula:

$$(Fe_{1-a-b}Ni_aM_b)_{100-x-y}Si_xB_y \quad (1)$$

(in the formula, M denotes at least one kind of element selected from Mn, Cr, Co, Nb, V, Mo, Ta, W and Zr, a, b, x and y are values satisfying $0.395 \leqq a \leqq 0.7$, $0 \leqq b \leqq 0.21$, $1-a-b<a$, $6 \leqq x \leqq 18$ at %, $10 \leqq y \leqq 18$ at %, respectively).

As obvious from the equation (1), an amorphous magnetic material (amorphous magnetic alloy) of the present invention contains Fe-Ni rich in Ni as a base component. Such an amorphous magnetic material, by employing a conventional liquid quenching method such as a single roll method, can be obtained through rapid quenching of a molten alloy satisfying a composition of the equation (1). As a concrete shape of the amorphous magnetic material of the present invention, a thin film ribbon can be cited.

An average sheet thickness of an amorphous magnetic thin film ribbon is preferable to be 30 $\mu$m or less in order to decrease the loss. An average sheet thickness of an amorphous magnetic thin film ribbon is more preferable to be 20 $\mu$m or less. By reducing the average sheet thickness of the amorphous magnetic thin film ribbon down to 20 $\mu$m or less, eddy current loss can be made sufficiently small, thereby the loss reduction in a high frequency region, in particular, can be attained. A more preferable average sheet thickness of the amorphous magnetic thin film ribbon is 15 $\mu$m or less. Further, an average sheet thickness here is a value obtained by the following equation, an average sheet thickness= weight/(density×length×width of the thin film ribbon).

In the above described equation (1), Ni and Fe are elements to be the base of magnetic alloys. In the present invention, Fe-Ni rich in Ni is used as a base component. Therefore, the value of a denoting a compounding ratio of Ni is set larger than (1-a-b) denoting compounding ratio of Fe. In other words, the value of a satisfies $(1-b)/2<a$.

Here, in an amorphous magnetic alloy in which only Ni is a base, a sufficient magnetic flux density can not be obtained, and Curie temperature $T_c$ is too low, thus, stability as a magnetic alloy can not be obtained. In an amorphous magnetic alloy in which only Fe is a base, as described above, its coercive force or its maximum magnetic flux density $B_m$ becomes too large, resulting in increase of the loss, further, in deterioration of its thermal stability. Further, when formed in a thin film ribbon with a liquid quenching method, the surface smoothness also is deteriorated.

Then, in the present invention, Ni compounded with Fe which contributes to make higher the magnetic flux density is used as a base component of a magnetic alloy. That is, an amorphous magnetic alloy of the present invention contains Fe-Ni rich in Ni as a base component. According to such an amorphous magnetic alloy, the magnetic properties comparable to those of the conventional Co based amorphous magnetic alloy can be obtained with an inexpensive Fe-Ni base. Further, an amorphous magnetic alloy of Fe-Ni base rich in Ni, being low in its melting point compared with Co base or Fe base amorphous magnetic alloy, when the amorphous magnetic alloy is made a thin film ribbon with a liquid quenching method and the like, its surface smoothness can be heightened.

The compounding ratio a of Ni in the above described equation (1) satisfies a condition of $(1-b)/2<a$, and further is in the range of $0.395 \leqq a \leqq 0.7$. When the value of a denoting a compounding ratio of Ni is less than 0.395, an effect due to Fe-Ni base rich in Ni can not be obtained. That is, increase of a relative Fe quantity invites, in addition to a large magnetostriction, increase of the loss and deterioration of thermal stability. Further, when formed a thin film ribbon with a liquid quenching method, the surface smoothness of the thin film ribbon deteriorates. Besides, when the value of a exceeds 0.7, in addition to the maximum magnetic flux density $B_m$ becoming too low, the Curie temperature $T_c$ decreases to result in difficulty of obtaining a practical stability of magnetic properties.

As described above, by setting the Ni compounding ratio a in the Fe-Ni base of the amorphous magnetic alloy in the range of $(1-b)/2<a$ and $0.395 \leqq a \leqq 0.7$, in addition to securing of the practical stability of the magnetic properties, the magnetic properties excellent in such as the low loss, low magnetostriction can be made to be realized with the Fe-Ni base inexpensive compared with the Co based amorphous magnetic alloy. Further, when a thin film ribbon of an amorphous magnetic alloy is formed by a liquid quenching method and the like, the surface smoothness can be improved. The compounding ratio of Ni a is particularly preferable to be in the range of 0.5 to 0.7.

At least one kind of the M element selected from Mn, Cr, Co, Nb, V, Mo, W and Zr is a component contributing to enhance its thermal stability or its magnetic properties of a magnetic alloy. The M element is not necessarily required to be added, but its addition is preferable in enhancing the thermal stability of an amorphous magnetic alloy. However, when the value b denoting the compounding ratio of the M element exceeds 0.21, because of difficulty of obtaining a stable soft magnetic property, the value b is set at 0.21 or less. Besides, in order to obtain effectively an effect of enhancing its thermal stability due to the M element, the compounding ratio b of the M element is preferable to be 0.001 or more. Further, the compounding ratio b of the M element is preferable to be in the range of 0.001 to 0.1.

It is preferable at least 2 kinds or more of the above described M elements to be used concurrently. In particular, it is preferable to use 2 kinds or more of elements selected from Mn, Cr and Co to be used as the M element. Among them, Mn and Cr are more preferable to be used. Three elements of Mn, Cr and Co can be compounded as the M element to form a composition. According to such M elements, thermal stability of an amorphous magnetic alloy of an Fe-Ni base rich particularly in Ni can be further enhanced. Improvement of the thermal stability brings about a magnetic alloy resistant to the variation per hour, thus, a magnetic material resistant to variation of a use environment, particularly resistant to temperature variation can be obtained. Mn displays an effect in lowering of the melting point of a magnetic alloy, too.

Here, the variation per hour denotes the degree of variation of the magnetic properties under a use environment of a magnetic core. To be excellent in its variation per hour characteristics means to be capable of maintaining the predetermined magnetic properties even after being left under a use environment, particularly under an environment high in its temperature. The variation per hour characteristics can be denoted with, for instance, [{(a magnetic property at room temperature after being left for a given time period under a certain environment)−(an initial magnetic property measured at room temperature)}/(an initial magnetic property measured at room temperature)]×100 (%). For instance, the rate of the variation per hour of direct current coercive force $H_c$ at room temperature after being left at 393K for 200 hours can be made 5% or less.

The amorphous magnetic material of the present invention is also excellent in temperature variation property. The temperature variation property is a variation rate of a magnetic property when the temperature is elevated on from room temperature. For instance, the variation rate of the magnetic flux density $B_{80}$ between 293K and 373K under 50 kHz, 80 A/m as a temperature variation property can be made 20% or less.

In the case of Mn and Cr being used as the M element, these compounding ratios are preferable to be in the range of 0.001 to 0.05, respectively. That is, in the above described equation (1), when the compounding ratio of Mn is denoted by b1, that of Cr is b2, it is desirable to apply an alloy composition substantially expressed by general formula:

$$(Fe_{1-a-b}Ni_aMn_{b1}Cr_{b2})_{100-x-y}Si_xB_y \qquad (2)$$

(in the equation a, b1, b2, x and y are values satisfying $0.395 \leqq a \leqq 0.7$, $0.001 \leqq b1 \leqq 0.05$, $0.001 \leqq b2 \leqq 0.05$, $1-a-b<a$, $6 \leqq x \leqq 18$ at %, $10 \leqq y \leqq 18$ at %, respectively). The alloy composition expressed by the equation (2) can further contain at least one kind of M' element selected from Co or Nb, V, Mo, Ta, W and Zr. The compounding ratio of these elements b3 is set such that the compounding ratio b as the M element is within 0.21. That is, $b1+b2+b3 \leqq 0.21$.

Si and B are indispensable elements for obtaining an amorphous phase. The compounding ratio of Si x is $6 \leqq x \leqq 18$ at %, that of B y is $10 \leqq y \leqq 18$ at %. When the compounding ratio of Si, x, is less than 6 at %, or that of B, y, is less than 10 at %, the thin film ribbon becomes brittle, thus, a magnetic thin film ribbon of good quality can not be obtained. On the contrary, when the compounding ratio of Si, x, exceeds 18 at %, or that of B, y, exceeds 18 at %, the maximum magnetic flux density $B_m$ and thermal stability deteriorate.

Total amount of Si and B, x+y, is preferable to be set in the range of 15 to 30 at %. When the total amount of Si and B is less than 15 at %, since the crystallization temperature becomes equal or less than the Curie temperature, the low coercive force and the high squareness ratio are likely not to be obtained. Besides, when the total amount of Si and B exceeds 30 at %, the maximum magnetic flux density $B_m$ and the thermal stability deteriorate. The preferable total amount of Si and B is in the range of 18 to 24 at %.

Further, the ratio between Si and B is preferable to be B rich, that is, x<y. In an amorphous magnetic material of the Fe-Ni base rich in Ni, by making the amorphous element B rich, the magnetic characteristics can be further enhanced. Therefore, x and y are desirable to be $7 \leqq x \leqq 9$ at %, $12 \leqq y \leqq 16$ at %.

An amorphous magnetic material, in which the above described Fe-Ni rich in Ni is a base, possesses a Curie temperature $T_c$ in the range of 473 to 573K. Therefore, practical stability of the magnetic characteristics can be obtained. When the Curie temperature $T_c$ of an amorphous magnetic material is less than 473K, the thermal stability deteriorates drastically, resulting in damaging practicality as a magnetic core such as a saturable core, a low loss core, a high permeability core. Besides, when the Curie temperature $T_c$ exceeds 573K, from a balance with the crystallization temperature, desired magnetic characteristics tend to be difficult to be obtained.

Further, in the amorphous magnetic material satisfying the above described composition, the maximum magnetic flux density $B_m$ can be in the range of 0.5 to 0.9T. When the maximum magnetic density $B_m$ exceeds 0.9T, the increase of the loss is introduced. Besides, when the maximum magnetic flux density $B_m$ is less than 0.5T, in the case of the amorphous magnetic alloy being applied in, for example, a saturable magnetic core, a sufficient squareness ratio can not be obtained. In the case of being applied for use of other than a saturable magnetic core, when the maximum magnetic flux density $B_m$ is less than 0.5T, in order to obtain a desired magnetic flux, a cross section of a core is required to be made large, resulting in a large core, further resulting in a problem of a large magnetic component.

The squareness ratio of an amorphous magnetic material of the present invention, namely, a ratio between residual magnetic flux density $B_r$ and the maximum magnetic flux density $B_m$ ($B_r/B_m$) can be set appropriately according to usage. Further, a squareness ratio here is a direct current squareness ratio, hereinafter will be referred to as a squareness ratio. The squareness ratio can be controlled by a heat treatment temperature and the like which will be described later. When an amorphous magnetic material of the present invention is applied in such a usage that requires saturabity, the squareness ratio is desirable to be set at 60% or more. The squareness ratio is further preferable to be 80% or more when used in a saturable core.

When an amorphous magnetic material is employed in a magnetic core used in such as a choke coil, a high frequency transformer, an accelerator or a laser power source, various kinds of magnetic materials for sensors such as a security sensor or a torque sensor, the squareness ratio is set at a value according to each usage. In concrete, the squareness ratio can be made 50% or less. Such a squareness ratio also can be obtained by controlling the heat treatment temperature.

Further, the amorphous magnetic material of the present invention, since its base is the Fe-Ni rich in Ni, its melting point can be made 1273K or less. Thus, by making the melting point of the amorphous magnetic material 1273K or less, when formed in a thin film ribbon with a liquid quenching method, the surface property of the thin film ribbon can be improved.

All the conventional amorphous magnetic materials of Co base or Fe base are high in their melting points such as around 1323 to 1473K. In order to obtain a thin film ribbon of high quality in its surface property with a liquid quenching method, usually, the viscosity of the molten metal is better to be low. Therefore, when being manufactured with a liquid quenching method, the temperature of the molten metal is required to be set at around 1573 to 1773K. However, when the temperature of the molten metal is high, not only thermal load on a cooling roll becomes large, cooling becomes difficult, but also the surface of the cooling roll becomes rough, resulting in deterioration of the surface quality of the thin film ribbon.

On the contrary, an amorphous magnetic material of the present invention, because of the low melting point of 1273K or less, can form a thin film ribbon under a condition wherein the temperature of the molten metal is lowered than the conventional one. Therefore, the thermal load on a cooling roll can be alleviated and the surface smoothness of the thin film ribbon can be heightened as well as the improvement of productivity of the thin film ribbon with a liquid quenching method.

According to an amorphous material of the present invention, the surface roughness $K_s$ of an amorphous thin film ribbon can be confined in the range of $1 \leqq K_s \leqq 1.5$. The surface roughness $K_s$ here is a value expressed by $K_s$=(a sheet thickness measured with a micrometer with 2 flat probe heads/a sheet thickness calculated from its weight). The sheet thickness by a micrometer with 2 flat probe heads is a measured value with a micrometer with 2 flat probe heads, in concrete, is an average value of each measured value obtained at 5 arbitrary points of a thin film ribbon, by dividing this average value by a value of the theoretical thickness calculated from its weight, $K_s$ can be obtained.

The more the surface roughness $K_s$ is close 1, the more high the surface quality and the less the unevenness of a thin film ribbon. When the $K_s$ value of an amorphous magnetic thin film ribbon exceeds 1.5, in the case of, for instance, being used as a saturable core, the magnetic properties such as the squareness ration deteriorates. Even when being used in an application of other than the saturable core, if the $K_s$ value exceeds 1.5, an occupancy ratio decreases, resulting in an increase of an apparent loss. Thus, according to an amorphous magnetic thin film ribbon of the surface roughness $K_s$ being in the range of $1 \leqq K_s \leqq 1.5$, an excellent magnetic characteristics can be obtained with fair stability.

As described above, according to the present invention, with an amorphous magnetic material in which the inexpensive Fe-Ni capable of lowering the manufacturing cost is a base, magnetic characteristics comparable to those of the Co based amorphous magnetic material can be obtained. In concrete, in the case of being used in application where low loss, low magnetostriction, high permeability, or saturability are required, magnetic characteristics excellent in such as the high squareness ratio can be obtained, further, the variation per hour property or the thermal stability such as temperature variation property of such magnetic properties can be enhanced. In addition, an amorphous magnetic thin film ribbon thinned by a liquid quenching method possesses an excellent productivity and surface smoothness. Based on these properties, the amorphous magnetic materials of the present invention can be effectively used in various magnetic components and are excellent in universality.

The amorphous magnetic materials of the present invention can be used as a magnetic core by, after thinning, for instance, with a liquid quenching method, coiling this amorphous magnetic thin film ribbon in a desired shape, or by stacking in a desired core shape after die-cutting the amorphous magnetic thin film ribbon in a desired shape.

Figure 2:
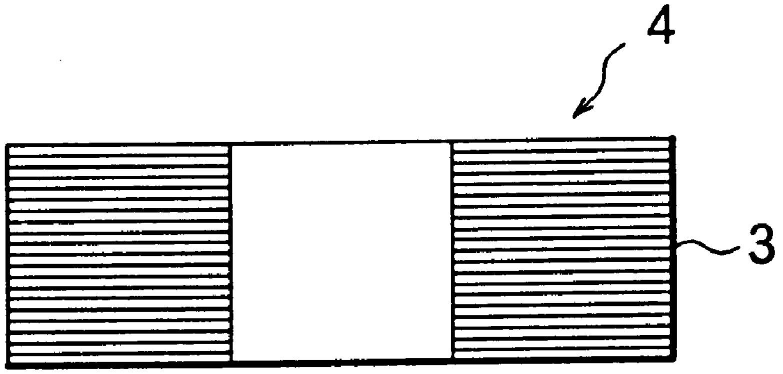
FIG. 2 is a sectional view showing a structure of a magnetic core of the other embodiment of the present invention.

FIG. 1 and FIG. 2 are sectional views respectively showing structures of the embodiments of magnetic cores of the present invention. A magnetic core shown in FIG. 1 is consisting of a coiled body 2 in which a thinned amorphous magnetic material of the present invention, that is, an amorphous magnetic thin film ribbon 1, is coiled in a desired shape. A magnetic core shown in FIG. 2 is consisting of a laminate 4 in which amorphous magnetic chips 3 obtained by punching the amorphous magnetic material of the present invention in a desired shape are stacked.

A magnetic core consisting of a coiled body 2 or a laminate 4, by implementing a stress relief heat treatment, can be made possible to be not only stress-relieved but also controlled in the squareness ratio. The stress relief heat treatment is usually carried out at a temperature between the Curie temperature and a crystalization temperature, but, when carried out at a temperature of around the Curie temperature +20 to 30K, such a high squareness ratio as 60% or more can be obtained, and, when carried out at a temperature of the Curie temperature −20 to 30K, such a low squareness ratio as 50% or less can be obtained.

An amorphous magnetic material of the present invention can be controlled in its suqareness ratio by controlling the heat treatment temperature, but, in order to further control the squareness ratio, after the stress relief heat treatment, a heat treatment in a magnetic field is effective.

As to the heat treatment in a magnetic field, the strength of an input magnetic field is 1 Oe or more, preferably 10 Oe or more, the atmosphere can be any one of an inert gas atmosphere such as nitrogen, argon and the like, a reducing atmosphere such as a vacuum and hydrogen gas, an atmosphere of air, but, the inert gas atmosphere is preferable. A heat treatment time period is preferable to be about 10 min to 3 hours, more preferable to be 1 to 2 hours.

Figure 3:
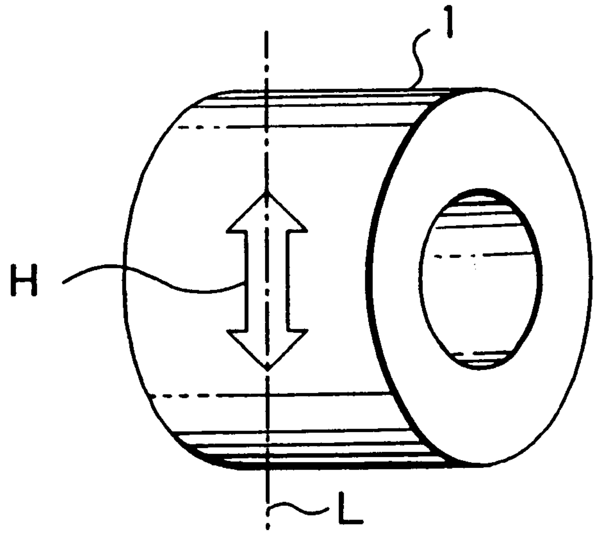
FIG. 3 is a diagram showing a length direction of a thin film ribbon, that is, a magnetic field inputting direction during a heat treatment in a magnetic field of the present invention.

When such a heat treatment is carried out in a magnetic field, if a squareness ratio ($B_r/B_m$) is required to be heightened to, for instance, 80% or more, a heat treatment under input of a magnetic field H in a direction of the length L of an amorphous film ribbon 1 as illustrated in FIG. 3 is effective.

Figure 4:
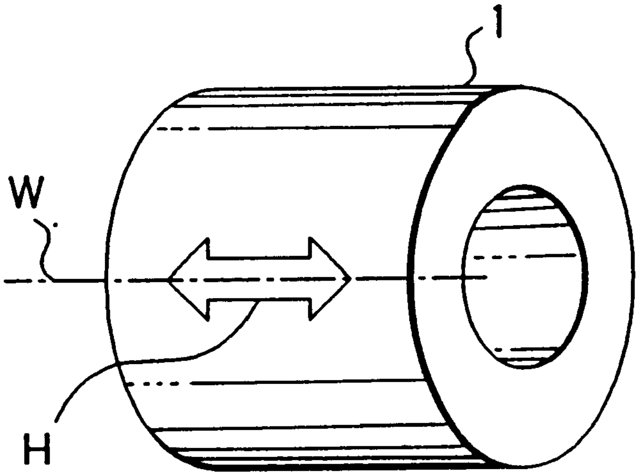
FIG. 4 is a diagram showing a width direction of a thin film ribbon, that is, a magnetic field inputting direction during a heat treatment in a magnetic field of the present invention.

Further, when the squareness ratio is required to be decreased down to 50% or less according to a usage of a magnetic core, further down to 40% or less, a heat treatment under input of a magnetic field H in a width direction W of a thin film ribbon 1 as shown in FIG. 4 is effective. A length direction or a width direction denoting a magnetic field input direction is not necessarily required to be horizontal to their direction, a little slanting can be allowed, but, is preferable to be in the range of ±20° from the horizontal direction.

Further, depending on the usage of a magnetic core, the heat treatment such as a stress relief heat treatment or a heat treatment in a magnetic field can be omitted. In this case, since the manufacturing step of a magnetic core can be reduced, resulting in a reduction of the manufacturing cost.

Such the magnetic cores as described above can be used in various applications such as a saturable core, a low loss core, a high permeability core, a low magnetostriction core. A saturable core in which a magnetic core of the present invention is applied is suitable for a saturable reactor or a noise killer element of a magamp, or a saturable core employed in an electric current sensor or an azimuth sensor. When being applied in a saturable core, as described above, the squareness ratio is set at 0.60 or more, further 0.80 or more.

The magnetic core of the present invention, other than the saturable core, by taking advantage of the low loss property, the high permeability property, the low magnetostriction property, can be used in a magnetic core used in a high frequency transformer including a high-power supply, a core of an IGBT, a choke coil of common mode, a choke coil of normal mode, an accelerator or a laser power supply, magnetic cores of various sensors such as a security sensor or a torque sensor.

In addition, the amorphous materials of the present invention, not restricted to a magnetic core consisting of a coiled body or a laminate of an amorphous magnetic thin film ribbon, can be used as magnetic components of various shapes. The amorphous magnetic materials of the present invention can be used in a magnetic head, too.

In the following, concrete embodiments of the present invention and evaluation results thereof will be described.

Embodiment 1

Alloy composites of each composition shown in Table 1 were compounded, respectively. After these each alloy composites were melted as mother alloys, by quenching with a single roll method, amorphous alloy thin film ribbons of 20 mm wide, 18 μm thick were prepared, respectively. The Curie temperature $T_c$, the direct current coercive force at an excitation magnetic field of 10 Oe, the maximum magnetic flux density $B_{10}$ at a magnetic field of 10 Oe were measured. The results are shown in Table 1.

Comparative example 1 in Table 1 are for an amorphous thin film ribbon which has only Ni as a base, an amorphous thin film ribbon which has only Fe as a base, an amorphous thin film ribbon in which Fe-Ni outside the composition range of the present invention is base, respectively. These each amorphous thin film ribbons of the comparative embodiment 1 were also evaluated of their characteristics similarly with the embodiment 1. These results are also shown in Table 1.

TABLE 1

| | Sample No. | Alloy composition | $T_c$ (K) | $H_c$ (mOe) | $B_{10}$ (T) |
|---|---|---|---|---|---|
| Embodiment 1 | 1 | $(Fe_{0.390}Ni_{0.585}Nb_{0.025})_{78}Si_8B_{14}$ | 508 | 7 | 0.70 |
| | 2 | $(Fe_{0.390}Ni_{0.585}V_{0.025})_{78}Si_8B_{14}$ | 508 | 9.5 | 0.69 |
| | 3 | $(Fe_{0.390}Ni_{0.585}Cr_{0.025})_{78}Si_8B_{14}$ | 543 | 8.5 | 0.67 |
| | 4 | $(Fe_{0.390}Ni_{0.585}Mn_{0.025})_{78}Si_8B_{14}$ | 548 | 7.5 | 0.75 |
| | 5 | $(Fe_{0.390}Ni_{0.585}Co_{0.025})_{78}Si_8B_{14}$ | 538 | 10.5 | 0.72 |
| | 6 | $(Fe_{0.390}Ni_{0.585}Mo_{0.025})_{78}Si_8B_{14}$ | 513 | 10.5 | 0.70 |
| | 7 | $(Fe_{0.390}Ni_{0.585}Ta_{0.025})_{78}Si_9B_{14}$ | 523 | 11.0 | 0.67 |
| | 8 | $(Fe_{0.390}Ni_{0.585}W_{0.025})_{78}Si_8B_{14}$ | 523 | 11.0 | 0.69 |
| | 9 | $(Fe_{0.390}Ni_{0.585}Zr_{0.025})_{78}Si_8B_{14}$ | 533 | 9.5 | 0.71 |
| | 10 | $(Fe_{0.399}Ni_{0.599}Mn_{0.002})_{78}Si_8B_{14}$ | 553 | 15.0 | 0.75 |
| | 11 | $(Fe_{0.374}Ni_{0.562}Mn_{0.064})_{78}Si_8B_{14}$ | 543 | 13.0 | 0.73 |
| | 12 | $(Fe_{0.318}Ni_{0.477}Mn_{0.205})_{78}Si_8B_{14}$ | 570 | 16.5 | 0.85 |
| | 13 | $(Fe_{0.285}Ni_{0.665}Mo_{0.050})_{76}Si_8B_{16}$ | 478 | 11.5 | 0.62 |
| | 14 | $(Fe_{0.390}Ni_{0.585}Co_{0.015}Cr_{0.01})_{78}Si_6B_{14}$ | 540 | 9.5 | 0.69 |
| | 15 | $(Fe_{0.390}Ni_{0.585}Co_{0.015}Mn_{0.01})_{78}Si_6B_{14}$ | 543 | 9.0 | 0.74 |
| | 16 | $(Fe_{0.390}Ni_{0.595}Cr_{0.015}Mn_{0.01})_{78}Si_8B_{14}$ | 546 | 8.0 | 0.71 |
| | 17 | $(Fe_{0.390}Ni_{0.575}CO_{0.015}Cr_{0.01}Mn_{0.01})_{78}Si_8B_{14}$ | 542 | 8.9 | 0.70 |
| | 18 | $(Fe_{0.390}Ni_{0.585}Mn_{0.025})_{82}Si_8B_{10}$ | 553 | 8.5 | 0.79 |
| | 19 | $(Fe_{0.399}Ni_{0.599}Mn_{0.002})_{73}Si_{17}B_{10}$ | 480 | 15.5 | 0.79 |
| | 20 | $(Fe_{0.390}Ni_{0.585}Mn_{0.025})_{75}Si_6B_{16}$ | 543 | 6.8 | 0.72 |
| Comparative example 1 | 21 | $(Ni_{0.974}Nb_{0.026})_{78}Si_8B_{14}$ | (Magnetism was not detected) | | |
| | 22 | $(Fe_{0.974Nb0.026})_{78}Si_8B_{14}$ | 783 | 40.0 | 1.40 |
| | 23 | $(Fe_{0.760Ni0.190}Mn_{0.050})_{80}Si_8B_{12}$ | 598 | 25.0 | 0.96 |
| | 24 | $(Fe_{0.390Ni0.585}Mn_{0.025})_{81}Si_{15}B_4$ | 543 | 28.0 | 0.85 |
| | 25 | $(Fe_{0.390Ni0.585}Mn_{0.025})_{80}Si_4B_{15}$ | 618 | 10.1 | 0.75 |

As obvious from Table 1, the amorphous alloy thin film ribbons satisfying the composition of the present invention possess the Curie temperature $T_c$ suitable for magnetic components, further possess a low coercive force and an adequate maximum magnetic flux density.

Embodiment 2

Alloy composites of each composition shown in Table 2 were compounded, these each alloy composites were melted. The curie temperature $T_c$ and melting point of each alloy are shown in Table 2. By rapidly quenching the molten metals of these each mother alloys with a single roll method, amorphous alloy thin film ribbons of 20 mm wide, 18 $\mu$m thick were prepared, respectively. Surface roughness $K_s$ of these each amorphous alloy thin film ribbons were measured. The results are shown in Table 2. The surface roughness $K_s$, as described above, was obtained from a sheet thickness measured with a micrometer with 2 flat probe heads and a sheet thickness calculated from the weight thereof.

TABLE 2

| Sample No. | Alloy composition | Tc (K) | Melting point (K) | Surface roughness $K_s$ |
|---|---|---|---|---|
| Embodiment 2 | | | | |
| 1 | $(Fe_{0.4}Ni_{0.585}Mn_{0.01}Cr_{0.005})_{78}Si_8B_{14}$ | 549 | 1233 | 1.05 |
| 2 | $(Fe_{0.4}Ni_{0.594}Mn_{0.001}Cr_{0.005})_{78}Si_8B_{14}$ | 550 | 1263 | 1.41 |
| 3 | $(Fe_{0.4}Ni_{0.510}Mn_{0.05}Cr_{0.04})_{78}Si_8B_{14}$ | 545 | 1243 | 1.17 |
| 4 | $(Fe_{0.334}Ni_{0.64}Mn_{0.01}Cr_{0.005}Co_{0.01})_{78}Si_8B_{14}$ | 538 | 1238 | 1.09 |
| 5 | $(Fe_{0.31}Ni_{0.55}Mn_{0.05}Cr_{0.004}Nb_{0.05})_{77}Si_9B_{14}$ | 545 | 1233 | 1.08 |
| 6 | $(Fe_{0.4}Ni_{0.585}Mn_{0.015})_{78}Si_8B_{14}$ | 550 | 1253 | 1.45 |
| 7 | $(Fe_{0.4}Ni_{0.585}Cr_{0.015})_{78}Si_8B_{14}$ | 545 | 1243 | 1.42 |
| Comparative example 2 | | | | |
| 8 | $(Fe_{0.72}Ni_{0.285}Mn_{0.01}Cr_{0.005})_{78}Si_8B_{14}$ | 580 | 1373 | 2.01 |
| 9 | $(Fe_{0.05}Co_{0.945}Nb_{0.005})_{72}Si_{16}B_{12}$ | 523 | 1373 | 1.96 |

As shown in Table 2, amorphous alloys satisfying composition of the present invention are low in their melting points compared with the conventional amorphous alloy of a Co base or an Fe base, thereupon, the surface smoothness being excellent.

Embodiment 3

The alloy composites of each composition shown in Table 3 were compounded, these alloy composites were melted. By rapidly quenching the molten metals of these each mother alloys with a single roll method, amorphous alloy thin film ribbons of a width of 20 mm, a thickness of 18 $\mu$m were prepared, respectively.

The magnetic flux density $B_{80}$ at 50 KHz, 80 A/m of these each amorphous alloy thin film ribbons was measured. The magnetic flux $B_{80}$ was, after first measured under a temperature environment of 293K, measured again when the temperature was elevated to 373K. The variation rate was obtained from the magnetic flux density $B_{80}$ at 293K and the magnetic flux density $B_{80}$ at 373K, thereby the temperature variation property was evaluated. These results are shown in Table 3.

TABLE 3

| Sample No. | Alloy composition | $B_{80}$ at 293K (T) | $B_{80}$ at 373K (T) | Variation rate (%) |
|---|---|---|---|---|
| Embodiment 1 | | | | |
| 1 | $(Fe_{0.4}Ni_{0.585}Mn_{0.01}Cr_{0.005})_{78}Si_8B_{14}$ | 0.70 | 0.60 | 14 |
| 2 | $(Fe_{0.4}Ni_{0.594}Mn_{0.001}Cr_{0.005})_{78}Si_8B_{14}$ | 0.73 | 0.65 | 11 |
| 3 | $(Fe_{0.4}Ni_{0.510}Mn_{0.05}Cr_{0.04})_{78}Si_8B_{14}$ | 0.67 | 0.61 | 9 |
| 4 | $(Fe_{0.335}Ni_{0.64}Mn_{0.01}Cr_{0.005}Co_{0.01})_{78}Si_8B_{14}$ | 0.63 | 0.55 | 13 |
| 5 | $(Fe_{0.31}Ni_{0.55}Mn_{0.05}Cr_{0.00}Nb_{0.05})_{77}Si_9B_{14}$ | 0.71 | 0.59 | 17 |
| 6 | $(Fe_{0.4}Ni_{0.585}Mn_{0.015})_{78}Si_9B_{14}$ | 0.71 | 0.60 | 16 |
| 7 | $(Fe_{0.4}Ni_{0.585}Cr_{0.015})_{78}Si_8B_{14}$ | 0.72 | 0.60 | 17 |
| Comparative example 3 | | | | |
| 8 | $(Fe_{0.72}Ni_{0.285}Mn_{0.01}Cr_{0.005})_{78}Si_8B_{14}$ | 1.14 | 0.80 | 30 |
| 9 | $(Fe_{0.05}Co_{0.945}Nb_{0.005})_{72}Si_{16}B_{12}$ | 0.60 | 0.51 | 15 |

As shown in Table 3, it is obvious that the amorphous alloys satisfying the compositions of the present invention are excellent in their temperature variation property compared with the conventional amorphous alloy of Fe base, comparable in their thermal stability with the amorphous alloy of Co base.

Embodiment 4

The alloy composites of each composition shown in Table 4 were compounded, these alloy composites were melted. By rapidly quenching the molten metals of these each mother alloys with a single roll method, amorphous alloy thin film ribbons of a width of 20 mm, a thickness of 18 μm were prepared, respectively.

The initial coercive force $H_{c1}$ and the coercive force $H_{c2}$ after left 200 hours at 393K of these each amorphous alloy thin film ribbons were measured at room temperature, respectively. The variation rates were obtained from these initial coercive forces $H_{c1}$ and the coercive forces $H_{c2}$ after being left at a high temperature, therewith, the variation per hour property was evaluated. These results are shown in Table 4.

TABLE 4

| Sample No. | Alloy composition | Hcl *1 (mOe) | Hc2 *2 (mOe) | Variation rate (%) |
|---|---|---|---|---|
| Embodiment 4 | | | | |
| 1 | $(Fe_{0.4}Ni_{0.585}Mn_{0.01}Cr_{0.005})_{78}Si_8B_{14}$ | 8.1 | 8.3 | 2.5 |
| 2 | $(Fe_{0.4}Ni_{0.594}Mn_{0.001}Cr_{0.005})_{78}Si_8B_{14}$ | 8.3 | 8.4 | 1.2 |
| 3 | $(Fe_{0.4}Ni_{0.510}Mn_{0.05}Cr_{0.04})_{78}Si_8B_{14}$ | 7.7 | 7.8 | 1.3 |
| 4 | $(Fe_{0.335}Ni_{0.64}Mn_{0.01}Cr_{0.005}Co_{0.01})_{78}Si_8B_{14}$ | 11.3 | 11.5 | 1.8 |
| 5 | $(Fe_{0.31}Ni_{0.55}Mn_{0.05}Cr_{0.004}Nb_{0.05})_{77}Si_9B_{14}$ | 8.8 | 9.0 | 2.3 |
| 6 | $(Fe_{0.4}Ni_{0.585}Mn_{0.015})_{78}Si_8B_{14}$ | 8.5 | 8.8 | 3.5 |
| 7 | $(Fe_{0.4}Ni_{0.585}Cr_{0.015})_{78}Si_8B_{14}$ | 9.0 | 9.3 | 3.5 |
| Comparative example 4 | | | | |
| 8 | $(Fe_{0.72}Ni_{0.265}Mn_{0.01}Cr_{0.005})_{78}Si_8B_{14}$ | 30.0 | 33.0 | 10.0 |
| 9 | $(Fe_{0.05}Co_{0.945}Nb_{0.005})_{72}Si_{16}B_{12}$ | 5.0 | 5.05 | 1.0 |

As shown in Table 4, it is obvious that the amorphous alloys satisfying the compositions of the present invention are excellent in their variation per hour property compared with the conventional amorphous alloys of Fe base, are comparable with the amorphous alloys of Co base in their thermal stability.

Embodiment 5

The alloy composites of each composition shown in Table 5 were compounded, these alloy composites were melted. By rapidly quenching the molten metals of these each mother alloys with a single roll method, amorphous alloy thin film ribbons of a width of 20 mm, a thickness of 18 μm were prepared, respectively.

After these each amorphous alloy thin film ribbons were slit in 5 mm width, each one was wound to form a coil of outer diameter of 12 mm×inner diameter of 8 mm, thus, fabricated a toroidal core consisting of the amorphous alloy thin film ribbons of the above described each compositions. After carrying out a heat treatment of each toroidal core for stress relief, further under an excitation magnetic field of 10 Oe, while inputting a magnetic field in a length direction of a thin film ribbon of each core, the squareness ratio ($B_r/B_{10}$) was measured.

Further, without exposing to the heat treatment in a magnetic field, the amorphous magnetic material of a composition identical as the embodiment 5-1 (Curie temperature 549K, crystallization temperature 742K) was heat treated for stress relief at various heat treatment temperatures of 593K (embodiment 5-8), 663K (embodiment 5-9), 713K (embodiment 5-10). Their squareness ratios were measured. The results are shown in Table 5.

TABLE 5

| Sample No. | Alloy composition | Squareness ratio $B_r/B_m$ |
|---|---|---|
| Embodiment 5 | | |
| 1 | $(Fe_{0.4}Ni_{0.585}Mn_{0.01}Cr_{0.005})_{78}Si_8B_{14}$ | 0.91 |
| 2 | $(Fe_{0.4}Ni_{0.594}Mn_{0.001}Cr_{0.005})_{78}Si_8B_{14}$ | 0.85 |
| 3 | $(Fe_{0.4}Ni_{0.510}Mn_{0.05}Cr_{0.04})_{78}Si_8B_{14}$ | 0.89 |
| 4 | $(Fe_{0.335}Ni_{0.64}Mn_{0.01}Cr_{0.005}Co_{0.01})_{78}Si_8B_{14}$ | 0.90 |
| 5 | $(Fe_{0.31}Ni_{0.55}Mn_{0.05}Cr_{0.004}Nb_{0.05})_{77}Si_9B_{14}$ | 0.91 |
| 6 | $(Fe_{0.4}Ni_{0.585}Mn_{0.015})_{78}Si_8B_{14}$ | 0.87 |

TABLE 5-continued

| Sample No. | Alloy composition | Squareness ratio $B_r/B_m$ |
|---|---|---|
| 7 | $(Fe_{0.4}Ni_{0.585}Cr_{0.015})_{78}Si_8B_{14}$ | 0.85 |
| 8 | $(Fe_{0.4}Ni_{0.585}Mn_{0.01}Cr_{0.005})_{78}Si_8B_{14}$ | 0.80 |
| 9 | $(Fe_{0.4}Ni_{0.555}Mn_{0.01}Cr_{0.005})_{78}Si_8B_{14}$ | 0.60 |
| 10 | $(Fe_{0.4}Ni_{0.585}Mn_{0.01}Cr_{0.005})_{78}Si_8B_{14}$ | 0.30 |
| Comparative example 5 | | |
| 8 | $(Fe_{0.72}Ni_{0.265}Mn_{0.01}Cr_{0.005})_{78}Si_8B_{14}$ | 0.79 |
| 9 | $(Fe_{0.05}Co_{0.945}Nb_{0.005})_{72}Si_{16}B_{12}$ | 0.93 |

As shown in Table 5, it is obvious that a magnetic core employing an amorphous alloy thin film ribbon satisfying the composition of the present invention has a high squareness ratio, is comparable with the conventional amorphous alloy of Co base in its saturability. Such a magnetic core is suitable for a saturable core. Further, it is obvious from the results that the squareness ratio can be controlled by varying the temperature of the stress relief heat treatment.

Embodiment 6

The alloy composites of each composition shown in table 6 were compounded, these alloy composites were melted.

By rapidly quenching the molten metals of these each mother alloys with a single roll method, amorphous alloy thin film ribbons of a width of 25 mm, a sheet thickness of 15 $\mu$m were prepared, respectively.

Each amorphous alloy thin film ribbon was coiled together with an interlayer dielectric film to form a core of an outer diameter of 70 mm×an inner diameter of 34 mm for an accelerator, respectively. The squareness ratio, relative permeability $\mu r$ and equivalent loss resistance R of these each cores were measured. Further, from the relative permeability $\mu r$ and the equivalent loss resistance R, R/$\mu r$ value was obtained. Here, for both cases where a stress relief heat treatment was applied after core formation and where was not applied, the relative permeability $\mu r$ and the equivalent loss resistance R were measured.

Further, as comparative examples of the present invention, with an amorphous alloy thin film ribbon of Co base which is generally low in iron loss, magnetic cores of the same shapes were fabricated. For these cores of the comparative examples too, the relative permeability $\mu r$ and the equivalent loss resistance R were measured, further, R/$\mu r$ was obtained. These results are also shown in Table 6.

TABLE 6

| Sample No. | Alloy composition | Stress relief annealing | Inter-layer insulator | Relative perme-ability $\mu r$ | Equivalent loss resistance R | R/$\mu r$ |
|---|---|---|---|---|---|---|
| Embodiment 6 | | | | | | |
| 1 | $(Fe_{0.385}Ni_{0.577}Mn_{0.026}Cr_{0.013}Si_{18}B_{14}$ | no | Poly-ester | 415 | 13.8 | 0.0332 |
| 2 | $(Fe_{0.365}Ni_{0.577}Mn_{0.026}Cr_{0.013})_{78}Si_{26}B_{14}$ | no | Poly-imide | 406 | 15.7 | 0.0387 |
| 3 | $(Fe_{0.365}Ni_{0.577}Mn_{0.026}Cr_{0.013})_{78}Si_{16}B_{14}$ | yes | Poly-imide | 91 | 2.8 | 0.0310 |
| 4 | $(Fe_{0.449}Ni_{0.538}Nb_{0.013})_{78}Si_{10}B_{12}$ | no | Poly-imide | 390 | 16.5 | 0.0423 |
| 5 | $(Fe_{0.449}Ni_{0.462}Co_{0.089})_{78}Si_{12}B_{10}$ | no | Poly-ester | 380 | 14.7 | 0.0387 |
| Comparative example 6 | | | | | | |
| 6 | $Co_{67}Fe_4Cr_4Si_{10}B_{15}$ | yes | Poly-ester | 530 | 82.1 | 0.1550 |
| 7 | $Co_{67}Fe_4Cr_4Si_{10}B_{15}$ | no | Poly-ester | 800 | 372.0 | 0.4650 |

Here, the R/$\mu r$ value is in general equivalent with the loss of an accelerator, the more smaller this value is, the loss is small. As shown in Table 6, a magnetic core employing an amorphous alloy thin film ribbon satisfying the composition of the present invention is low in the R/$\mu r$ value, therefore, effective to realize an accelerator of low loss.

Further, a magnetic core employing an amorphous thin film ribbon of the present invention, irrespective of being heat treated for stress relief or not, displays an excellent characteristics. Thus, according to the present invention, without carrying out a heat treatment for stress relief, an accelerator core of low loss can be provided. Since the elimination of the heat treatment step simplifies fabricating steps of a magnetic core, a magnetic core of further low cost can be realized.

In addition, all the magnetic cores of embodiment 6 which were used as cores of accelerators possess the squareness ratio of 0.45 or less. Like this, even in a field where a material of a low squareness ratio can be well applied, an excellent results can be obtained.

As described above, according to amorphous magnetic materials of the present invention, magnetic properties applicable in a high frequency region, thermal stability, surface smoothness can be realized with inexpensive amorphous magnetic materials of Fe-Ni base. Therefore, by employing such amorphous magnetic materials, in addition to satisfying characteristics required for various kinds of usage, magnetic cores and the like in which the fabricating cost is decreased can be provided.

What is claimed is:

1. An amorphous magnetic material essentially consisting of a composition expressed by general formula:

$$(Fe_{1-a-b}Ni_aM_b)_{100-x-y}Si_xB_y$$

(in the formula, M denotes at least one kind of element selected from Mn, Cr, Co, Nb, V, Mo, Ta, W and Zr, a, b, x and y are values satisfying $0.395 \leqq a \leqq 0.7$, $0 \leqq b \leqq 0.21$, $1-a-b<a$, $6 \leqq x \leqq 18$ at %, $10 \leqq y \leqq 18$ at %, respectively).

2. The amorphous magnetic material as set forth in claim 1:

wherein, the M element includes 2 or more kinds of elements selected from Mn, Cr and Co.

3. The amorphous magnetic material as set forth in claim 1:

wherein, the M element includes Mn, Cr and Co.

4. The amorphous magnetic material as set forth in claim 1:

wherein, a content of the M element b satisfies $0.001 \leqq b \leqq 0.1$.

5. The amorphous magnetic material as set forth in claim 1:

wherein, the content of the Si x and the content of the B y satisfy $15 \leqq x+y \leqq 30$ at %.

6. The amorphous magnetic material as set forth in claim 1:

wherein, the content of the Si x and the content of the B y satisfy a relation of $x<y$.

7. The amorphous magnetic material as set forth in claim 1:

wherein, Curie temperature $T_c$ is 473K or more and 573K or less.

8. The amorphous magnetic material as set forth in claim 1:

wherein, the maximum magnetic flux density $B_m$ is 0.5T or more and 0.9T or less.

9. The amorphous magnetic material as set forth in claim 1:

wherein, a ratio $B_r/B_m$ of a residual magnetic flux density $B_r$ and the maximum magnetic flux density $B_m$ is 0.60 or more.

10. The amorphous magnetic material as set forth in claim 9:

wherein, the ratio $B_r/B_m$ is 0.80 or more.

11. The amorphous magnetic material as set forth in claim 1:

wherein, a ratio $B_r/B_m$ of a residual magnetic flux density $B_r$ and the maximum magnetic flux density $B_m$ is 0.50 or less.

12. The amorphous magnetic material as set forth in claim 1:

wherein, a melting point of the amorphous magnetic material is 1273K or less.

13. The amorphous magnetic material as set forth in claim 1:

wherein, the amorphous magnetic material has a thin film ribbon shape.

14. The amorphous magnetic material as set forth in claim 13:

wherein, an amorphous magnetic material having the thin film ribbon shape has a surface roughness $K_s$ satisfying $1 \leqq K_s \leqq 1.5$, wherein the surface roughness is expressed by a value obtained by dividing a sheet thickness measured with a micrometer with 2 flat probe heads by a sheet thickness calculated from its weight.

15. The amorphous magnetic material as set forth in claim 13:

wherein, an amorphous magnetic material having the thin film ribbon shape has an average sheet thickness of 30 $\mu$m or less.

16. A magnetic core comprising a coiled body or a laminate of an amorphous magnetic material having the thin film ribbon shape as set forth in claim 13.

17. The magnetic core as set forth in claim 16:

wherein, the amorphous magnetic material contains as the M element 2 kinds or more of elements selected from Co, Cr and Mn.

18. The magnetic core as set forth in claim 16:

wherein, the amorphous magnetic material possesses a Curie temperature $T_c$ of 473K or more and 573K or less, the maximum magnetic flux density $B_m$ of 0.5T or more and 0.9T or less, a ratio $B_r/B_m$ of a residual magnetic flux density $B_r$ and the maximum magnetic flux density $B_m$ of 0.60 or more.

19. The magnetic core as set forth in claim 16:

wherein, the amorphous magnetic material possesses a Curie temperature $T_c$ of 473K or more and 573K or less, a ratio $B_r/B_m$ of a residual magnetic flux density $B_r$ and the maximum magnetic flux density $B_m$ of 0.50 or less.

20. A saturable core comprising a coiled body or a laminate of the amorphous magnetic material possessing the thin film ribbon shape as set forth in claim 13:

wherein, the amorphous magnetic material possesses a Curie temperature $T_c$ of 473K or more and 573K or less, the maximum magnetic flux density $B_m$ of 0.5T or more and 0.9T or less, a ratio $B_r/B_m$ of a residual magnetic flux density $B_r$ and the maximum magnetic flux density $B_m$ of 0.60 or more.

* * * * *